Feb. 22, 1966  M. G. ZAVERTNIK ETAL  3,236,989
EXPLOSION-PROOF ELECTRICAL ACCESSORY ASSEMBLY
Filed Aug. 9, 1963  2 Sheets-Sheet 1
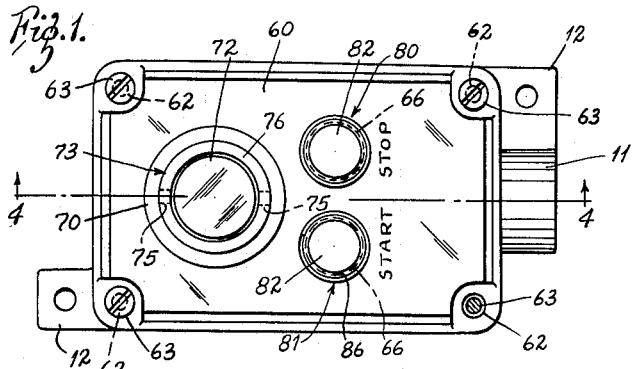
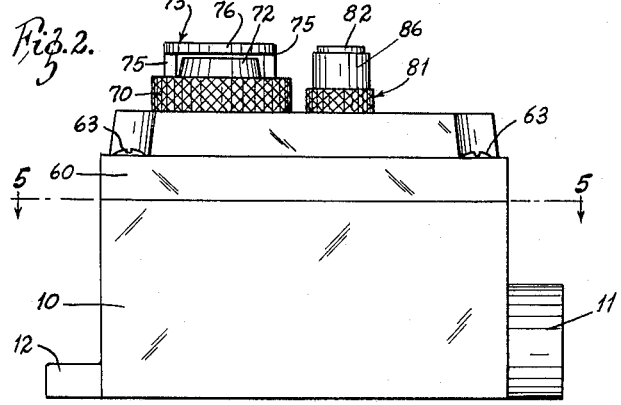
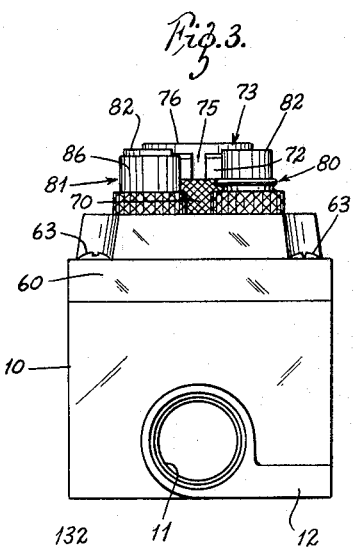
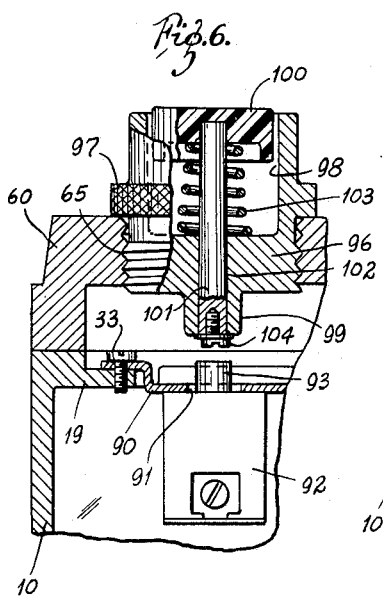
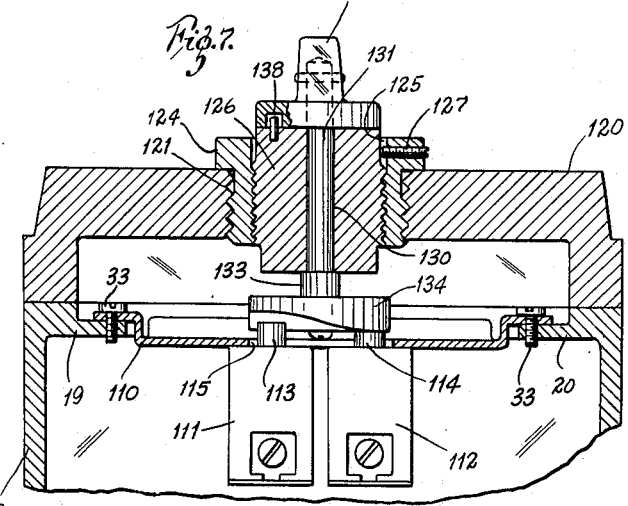
INVENTORS:
MARSHALL G. ZAVERTNIK,
RICHARD E. WEBER,
BY Kingsland, Rogers, Ezell & Robbins
ATTORNEYS Feb. 22, 1966   M. G. ZAVERTNIK ETAL   3,236,989
EXPLOSION-PROOF ELECTRICAL ACCESSORY ASSEMBLY
Filed Aug. 9, 1963   2 Sheets-Sheet 2
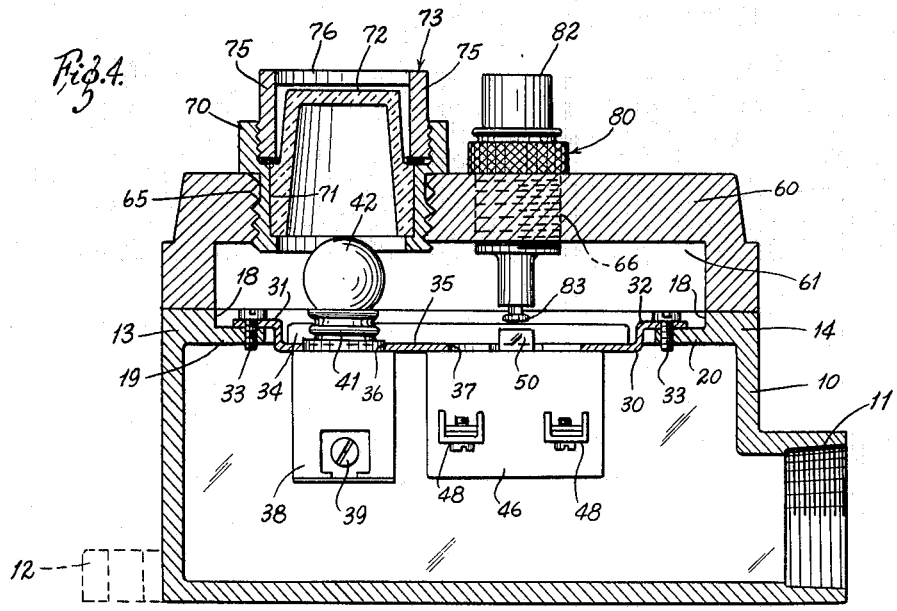
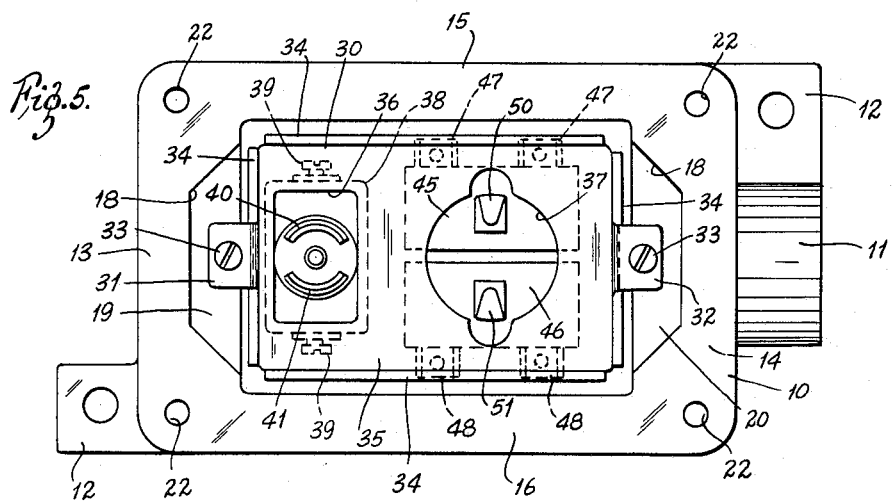
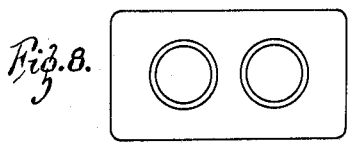
INVENTORS:
MARSHALL G. ZAVERTNIK,
RICHARD E. WEBER,
By Kingsland, Rogers, Ezell & Robbins
ATTORNEYS United States Patent Office 3,236,989
Patented Feb. 22, 1966

3,236,989
EXPLOSION-PROOF ELECTRICAL
ACCESSORY ASSEMBLY
Marshall G. Zavertnik, Manchester, and Richard E. Weber, Arnold, Mo., assignors to Killark Electric Manufacturing Company, St. Louis, Mo., a corporation of Missouri
Filed Aug. 9, 1963, Ser. No. 301,043
7 Claims. (Cl. 200—168)

The present invention relates to an electrical unit box assembly, particularly one in which an explosion-proof box is provided of such nature that it can selectively be combined with push button switches, pilot lights and selector switches in various combinations, with a minimum number of parts.

The assembly includes essentially a box having three separable components, namely, a main box portion, a cover portion, and a plate sometimes called a despard strap. The box base or main box portion is uniformly made in quantity. The despard strap is a relatively small and replaceable element designed to receive and support electrical units in the combinations required, the units being pilot lights, switches, and the like. The units are suspended by it into the explosion-proof main box, and which have operating elements projecting upwardly. (Throughout this description, the box is assumed to be upright, and the terminology is used accordingly. It is understood that this is for convenience only, and that the box can be used in other positions.) Since there are relatively few combinations of switches and lights required, an inventory of despard straps and electrical units corresponding to the requirements can be kept. All straps have identical means for attaching them to the main box base, so that any strap sub-assembly can be used with any box base.

The cover has a smooth bottom edge fitting over a top edge on the box base with sufficient area and tightness to inhibit flame passage. Screws hold the cover tightly to the box base.

The cover is provided with openings in a relatively small number of arrangements, corresponding to the arrangements of electrical units mentioned above. The covers have one or perhaps two types of holes through them, to receive members that finish out the electrical units.

Thus there are switch operating devices for push button switches and selector switches, and cover glasses for lights. In all cases, the assembly in the box is explosion-proof. All of these electrical unit devices in the covers are provided with a single type of connecting means (or perhaps one of two types) so that by providing only one (or two) types and sizes of holes in the cover, any kind of switch or light device can be located in any hole in the cover. Actually only about four or five different arrangements of these identical cover holes accommodates the full range of electrical unit combinations.

The present arrangement has, for its object, to eliminate as many as possible of the previously required individual box and operating elements. Heretofore it has been customary to mount each electrical unit in its own individual box. So specifically, the present invention has for its object the minimization of the number of boxes required. This latter is achieved by providing an inventory of subassemblies of despard straps and different electrical units, instead of supplying a box for each electrical unit and its strap. Formerly the assembling company or the ultimate user purchased boxes from one source and electrical units from another source, a despard strap coming attached to each electrical unit.

The present invention also has for its object to minimize the number of box components. This is achieved by making the box bases all identical, and then by making the electrical unit sub-assemblies on the straps all have identical connecting means for attachment to the box bases. Thus the assembler need only obtain a box and select his chosen combination of electrical units for the strap, and secure the strap in the box bases. Then, since the covers are made and kept with the identical holes disposed in all of the possible arrangements of the units, the assembler obtains an appropriate cover. He also obtains the appropriate switch or pilot cover, all of which have identical threads, and he fits them properly into the cover holes. Then he attaches the cover to the box base.

The pilot light parts, push button switch parts and selector switch parts are all made to fit these same openings and yet to afford the proper operating arrangements for the particular accessories in question, and to provide explosion-proof qualities.

With these and other objects in mind, as will appear in the description to follow, reference is now made to the drawings, wherein:

FIGURE 1 is a top plan view of one embodiment of the invention;

FIGURE 2 is a side elevation thereof;

FIGURE 3 is an end elevation thereof taken from the right of FIGURE 2;

FIGURE 4 is a longitudinal section taken on the line 4—4 of FIGURE 1;

FIGURE 5 is a top view of the arrangement shown in FIGURE 4, with the cover removed, taken on the line 5—5 of FIGURE 2;

FIGURE 6 is a fragmentary sectional view showing the use of a push button switch in the place of the pilot light shown in FIGURES 4 and 5;

FIGURE 7 is a fragmentary sectional view similar to FIGURE 4, but showing the use of a selector switch; and FIGURE 8 is a diagrammatic view of an alternative arrangement for two larger units (switches or lights) in the box.

Referring first to FIGURES 1–5, the assembly has a main box or box base 10 having bottom, side and end walls, the right end wall having a connector outlet 11 adapted to receive a conduit, so that wiring connections may be brought into the box but may be sealed off. At diagonally opposite corners the box base 10 has ears 12 with screw holes through them for use in attaching the box to a support.

The box has inturned top edge flanges at its ends and sides, the end flanges being most clearly illustrated at 13 and 14 in FIGURE 4. The side flanges are shown at 15 and 16 in FIGURE 5. The end top flanges 13 and 14 have partial recesses 18, here shown as being trapezoidal in shape, so as to provide depressed ledges 19 and 20. Since the box must be explosion-proof, its walls must be tight. Preferably the box base is a single aluminum casting. Its upper edges are made smooth, and are provided with appropriate threaded holes 22 to receive screws for attachment of the cover, as will appear.

The ledges 19 and 20 on the top flanges 13 and 14 of the main box body 10 are designed to support a despard strap 30. This strap is preferably made in the form of a steel stamping having ears 31 and 32 at its opposite ends to receive screws 33 by means of which it can be removably attached to the flanges 19 and 20. The plate 30 has upstanding flanges 34 around its four sides to give it rigidity, and it has a main flat portion 35 upon which the electrical units are to be mounted.

The units normally required are selector switches, push button switches and pilot lights. Usually there are one or two switches and one or two pilot lights, but as will appear, these can be in other combinations. In FIGURES 1–5, the pilot light and two small switches have been illustrated. To this end, the despard strap has a rectangular opening 36 and a generally circular opening 37 through it. Below the strap and mounted upon it by appropriate screws or other means (not illustrated) is a pilot light unit 38. It has appropriate electrical terminals 39 and two upstanding arcuate threaded flanges 40 and 41, these being threaded to receive a conventional pilot light bulb 42. The opening 36 is sized to receive these components. It will be understood that the terminals 39 are connected to supply power to the bulb, in a familiar manner.

Beneath the other opening 37 in the despard strap 35 are suspended two switches 45 and 46. These switches have appropriate terminal connectors 47 and 48, respectively. The switches can be suspended from the strap by means not illustrated, such as screws. The switch 45 has a switch operating reciprocable member 50 and there is a similar such member 51 for the switch 46. These two operating push elements 50 and 51 project outwardly through the opening 37, and are normally spring-pressed upwardly.

The cover constitutes the third principal component of the present assembly. This cover 60 is made, preferably, of a relatively thick casting, as shown, with a recess 61 in the under side thereof. The corners of the cover can be arcuately cut away to provide four holes 62 to receive attaching screws 63 that engage in the threaded openings 22 on the main box 10, so that the cover can be very securely held in place. The bottom edges of the cover are smooth and complementary to the top edge of the box base 10. The area of contact between the bottom surfaces of the cover 60 and the upper inturned flanges of the box are appropriate to prevent the transmission of flange, as by explosion, when the cover is secured in place.

The cover 60 is illustrated as having in it a threaded opening 65 that is disposed above the pilot light to receive a pilot light glass assembly. The cover 60 also has in it two smaller threaded openings 66, identical with each other and designed to receive switch operating elements for the operation of the switches 45 and 46.

The pilot light cover comprises a connector member 70 that is externally threaded to engage in the threaded hole 65. The connector 70 has a bore 71 in it terminating in a lower shoulder. A heavy inverted, cup-shaped glass cover element, preferably of colored glass material 72 is inserted into the connector 70 until its lower edge engages on the lower shoulder at the bottom terminal of the recess 70, thus disposing the glass over the pilot bulb 42. A metal ring 73, with external threads around its lower portion, is threaded into an upper and somewhat larger bore in the connector 70 and can engage (with appropriate packing means) an external shoulder on the inverted glass cup 72, to bind it securely in place. The member 73 preferably has vertical side straps 75 and a top ring 76 so that the colored glass 72 is exposed at the top and at most of the sides of the member 73, but is protected against lateral blows. If desired, cement can be supplied around the lower part of the glass to insure that it is sealed in place and that no flame paths are available. However, the tight fit and the sealing by the packing at the bottom of the member 73 normally is sufficient. The threads in the hole 65 are sufficient to prevent flame passage.

The entire pilot cover assembly can be quickly removed since the flanged portion at the top of the connector 70 is knurled to make it easy to turn. Of course, if the glass 72 becomes broken or cracked, it can be replaced by unscrewing the guard 73, removing the glass 72, replacing it, and then reassembling the components.

Push button devices 80 and 81 are mounted above the switch-operating elements 50 and 51 in the identical threaded holes 66 in the cover 60. The threaded engagements prevent flame passage. The stop push button is illustrated in FIGURE 4 as being supported in a block with external threads engageable in the threaded hole 66. It has its upper enlarged portion knurled so that it can be threaded and unthreaded. It contains a reciprocable, spring-urged push button 82 that operates a pusher element 83 projecting from the bottom of the threaded member 80. Since this structure is, except for size, substantially similar to the one later to be described in connection with FIGURE 6, it will not be described here in detail.

The so-called start switch 81 is similar to the switch 80, but it has a collar around it, as shown at 86, so that the button is not immediately accessible and cannot be accidentally depressed. This is shown in FIGURE 6, and therefore, these details need not be described here.

The two holes 66 are so located that when the switch operating elements 80 and 81 are threaded into place, their operating elements will be disposed directly above the members 50 and 51 of the switches 45 and 46. Hence, depressing of the buttons 82 and 86 can depress the reciprocating members 50 and 51 and operate the switches in a manner that is known in the art.

FIGURE 6 illustrates an assembly similar to that of FIGURES 1–5, except that a reciprocating switch is substituted for the pilot light. In this case the base portion 10 of the box is the same. The despard strap 90 here has an opening 91 to receive a switch 92 attached beneath the strap 90 by appropriate means not shown. The switch operating reciprocable element 93 projects outwardly through the opening 91 in the strap 90 and is the means by which the switch 92 is operated.

The box cover 60 is here the same as in FIGURE 4 and has the same threaded opening 65. However, in this case, this identical opening 65 receives a reciprocating switch button. This last consists of a button housing 96 externally threaded to engage in the threads of the opening 65 of the cover 60. As before, the member 96 has a knurled flange 97 for making it easy to insert and remove. It has a counterbore 98 extending downwardly from the top. On its bottom it has a depending cylindrical element 99, disposed above the switch operating pin 93. This interconnection is identical with that of the lamp glass assembly, above.

A push button 100 is mounted upon a pin 101 that fits through a bore 102, through the base of the member 96 and the projection 99 thereon, so as to afford a relatively long and fairly close sliding fit between the pin 101 and the hole 102. By this arrangement, no flame can be transmitted from inside the box through this switch actuating element.

The button 100 is urged upwardly by a coil spring 103, as illustrated. The bottom of the pin 101 receives a headed screw 104. This screw can be removed to permit the assembly and dis-assembly of the push button and it also acts as an actuating member, to engage and depress the switch operating member 93. With appropriate washers and shims, the screw 104 can be adjusted in and out to adjust the point of operating of the switch 92 upon depression of the button 100.

The foregoing also represents the nature of the two switches 80 and 81 previously described. It will be noted that, in FIGURE 6, the push button 100 is set down into the counterbore 98. In this respect, it is like the switch 81 since the finger must be pressed inside of the counterbore to operate the switch. The arrangement is desirable to keep the switch from being inadvertently operated. The switch 80, however, has the operating button 81 exposed so that it can be engaged from any angle. This is desirable for a stop switch.

FIGURE 7 shows a slightly different arrangement. In this case, the box portion 10 is the same. The despard strap 110 is the same in principle as those previously described and is identically mounted onto the box member flanges. It will be observed that it is very easy to substitute one despard strap with its appropriate accessory switches or lights, for another, simply by removing the screws, such as the screws 33 that hold it in place, and substituting another strap and electrical unit sub-assembly.

In FIGURE 7 a selector switch is shown. This is illustrative only as being a typical selector switch with oscillatable handle. It is illustrated as operating two switches simultaneously.

The despard strap 110 has two switches 111 and 112. The switch 111 has a depressible button 113 and the switch 112 has a similar such button 114. These project through an opening 115 is the strap 110.

In this case the cover 120 is attached by identical means to the base of the box 10. However, here it has a central threaded opening 121. This opening is identical in size and threading to the opening 65 previously described, so that it can receive the same operating element, such as the pilot light cover or the push button switch, if desired.

The opening 121 is centrally located, which is convenient where there is only one or one set of accessories to be operated.

In this case, the selector switch includes an outer fitting 124 that has external threads by means of which it is tightly secured into the opening 121. It also has a counterbore 125, the lower part of which is threaded to receive the external threads of a member 126. This member is threaded down until it reaches an appropriate level above the switch operating member 113 for reasons to appear and then can be locked in place by a setscrew 127.

The block 126 has a central bore 130 through it; and this receives an oscillating pin 131 that is attached in a knob or handle 132 at the top of the block 126. The pin 131 projects through the block with a close fit to inhibit passage of flame from the interior of the box. At its bottom, the pin 131 is enlarged somewhat so that it bears against the bottom of the block 126, as shown at 133, and to the bottom of this portion is attached a camming device 134. This cam, as shown, has two lower sloping portions, each occupying half of its under-surface and one over-lying the operating element 113, the other overlying the operating element 114 of the switches 111 and 112, respectively.

By the foregoing arrangement, rotation of the knob 132 turns the cam 134 and the under-surfaces of the cam then depress the two switch elements 113 and 114 to permit them to rise again by their internal spring arrangements. If desired, a pin and groove arrangement 138 can be supplied between the knob 132 and the upper surface of the block 126 to limit the amount of oscillation.

In FIGURE 8 is diagrammatically shown an arrangement of two larger units, such as pilot lamps or switches.

From the foregoing descriptions it can be seen that all of these assemblies use the same base 10 of the box with its internal upper flanges that receive and support one or another of the several despard strap arrangements. In this case the box manufacturer will obtain the appropriate accessory elements, whether they be pilot lights, switches or such, and will assemble them in the usually called for combinations upon appropriate despard straps. As needed, he will then supply the assemblies of despard straps and accessories to boxes 10. He has covers 60 or 120 or the like, that are appropriate to the usual dispositions of operating elements for the conventional assemblies. The covers 60 or 120 are indifferent to whether the larger holes are occupied by push button switches as in FIGURE 6, by rotatable switches as in FIGURE 7, or by pilot lights as in FIGURE 4. The smaller holes will receive many of the switch arrangements, such as those illustrated.

For example, if it is known that one pilot light with a start and stop switch are required, the asssembly will be made from a plate 60 with the pilot light cover and the switch elements, as indicated. Previously, the box base will have been assembled together with a despard strap having mounted on it the pilot light device 38 and the two switches 45 and 46. These, therefore, can be collected from a relatively small number of components.

On the other hand, if the requirement is not for a pilot light in the association of FIGURE 4, but for a push button switch, such as that shown in FIGURE 6, it is necessary only to have a switch such as 92 mounted on the despard strap in place of the pilot light 38 and to assemble a push button device, as illustrated in FIGURE 6, directly in the hole 65. Therefore, the only changes required for this assembly are in the choice of the switch elements, the despard strap, and the push button block illustrated in FIGURE 6.

Or, if the assembly is to be made with a so-called selector switch, which is rotating device, the operating elements as shown at FIGURE 7 could be assembled in the opening 65 as needed and the appropriate push button switch located therebelow on the despard strap or, as specifically illustrated in FIGURE 7, the selector switches could be mounted centrally on their strap 110 and a cover 120 having a large central opening could be employed. It is equally obvious that a pilot light or push button switch could be mounted centrally in the cover 120. Since the box is rectangular, the despard strap assemblies and covers can be disposed either way with respect to the connector 11.

In all of these assemblies, there is no possibility of the transmission of explosions from the interior to the exterior of the box. All have interfitting surfaces of sufficient length to prevent this. Where the parts are not threaded together, they have a greater length and tightness to prevent the transmissions of explosions from inside the box to the exterior thereof. All of this is provided without loss of the flexibility of the arrangements.

Various changes and modifications may be made within the process of this invention as will be readily apparent to those skilled in the art. Such changes and modifications are within the scope and teaching of this invention as defined by the claims appended hereto.

What is claimed is:

1. In an electrical polygonal box assembly: a polygonal box base and a box cover, the base having bottom, side and end walls and an open top; means providing a threaded opening through one of the walls for introduction of electrical leads and connection of a threaded conduit; a polygonal top surface on the box base adapted to receive at will one of a number of the covers that have under polygonal surfaces complementary to the said top surface, removable means to attach the cover to the box base tightly and to draw the complementary surfaces of the base and cover together, the said complementary box base and cover surfaces being smooth and of sufficient extent to inhibit flame flow when the cover is attached in place; the box base having supporting and connection means to receive any one of a number of different mounting plates, all of which have connecting means complementary to those on the box, one such plate having means to support at least two different electrical units; the said one such removable plate being secured to the box base and spanning the open top of the box base below the cover, at least two electrical units supported on the plate, each having its operating portion at the top of the plate and below the cover; the cover having at least two openings through it, above the units, with attaching means in each opening; a member mounted in each opening with attaching means complementary to those in the opening, said members comprising interfitting parts, and being cooperable with the operating portions of the electrical units on the plate, the interfitting parts being separable but having means to prevent egress of flame from the box.

2. In a box for different electrical units; a box base having integral bottom, side and end walls; the side and end walls having smooth upper edges; the upper edges extending all around the box base, providing a continuous sealing edge of non-circular shape, and having an opening within the continuous edge, into the box space; an electrical unit-receiving plate adapted to span the opening, means removably attaching it across the opening; at least two electrical units mounted on the plate, extending below it, the plate having holes through it giving access to the electrical units from the top of the box base; a cover for the box base, the cover having a smooth bottom edge complementary to the upper sealing edge of the box base as to have a close fit therewith, the width of the said interfitting edges being such that when they are secured together they inhibit flame passage from within the box; removable means to secure the cover tightly onto the box base and to clamp the edges of the base and cover into sealing relationship; the cover having a hole through it opposite each electrical unit; and a member mounted securely and removably in each such opening, each member comprising a plurality of parts, the joints between the parts, the members, and the cover being of sufficient length and tightness to inhibit flow of flame from inside the box, at least one of the members having its parts including a movably mounted actuating device extending through the cover; and a conduit fitting on the box through which electrical leads may be introduced into the box, the fitting having walls designed to provide a flame-proof connection with a conduit.

3. The box of claim 2, the holes through the cover being of identical size and being threaded; and at least one of the electrical units being a switch, and the corresponding threaded member being a switch-actuating device.

4. The box of claim 2, wherein one electrical unit is a switch, and the corresponding member in the cover is a switch operating device, the operating device including a block with a hole through it from inside to outside of the cover, a pin closely fitting through the hole for movement therein, and means to cause movement of the pin to operate the switch including a member on the outer end of the pin to be manually engaged; the length of the engagement of the pin in the hole and the closeness of the fit being such as to inhibit flow of flame through the hole.

5. The box of claim 2, wherein one electrical unit is a lamp, and the corresponding member in the cover is a lamp glass cover, including an outer fitting threaded into the hole in the cover, an inverted cup-shaped glass inserted into the fitting over the lamp, a ring threadedly fitting into the fitting, securing the glass in place, the ring having guard elements over limited areas of the glass and around the upper part of it.

6. The box of claim 4 wherein the switch block has a depending central projection through which the hole extends, and a counterbore in the upper side thereof, the manually engageable member being reciprocably mounted in the counterbore onto the end of the pin, a spring between the manually engageable member and the bottom of the counterbore, and an enlarged removable head on the bottom end of the pin.

7. In a box of the kind described: a box base of generally rectangular shape, having a bottom wall, side walls and end walls, and an open top; the side and end walls having smooth upper edges providing a continuous rectangular upper sealing edge extending around the top of the box base, the base being open inside the sealing edge to give access to the interior of the base; the base having opposite ledge means below the sealing edge at opposite ends; a despard plate sized to span the base from end to end, with portions removably secured to the opposite ledge means; a plurality of integral electrical units mounted on the plate, each depending below the same and also above it through the open upper part of the base, at least one of the units having a movable operating element projecting above the plate; a cover for the base, the cover having a continuous, smooth, sealing edge around its under surface, complementary to that on the base, the two such surfaces having a width sufficient to suppress flame paths from within the box to the outside; separate and removable means to clamp the cover tightly onto the base in predetermined orientation to bring the sealing edges together; the cover having openings through it, one opposite each electrical unit in the base, and means sealingly closing said openings, at least one of said means incorporating a movable operating device supported in the cover independently of the base for cooperation with the operating element of the electrical unit in the base opposite to it, and positioned opposite said operating element by securing the cover in its predetermined orientation as aforesaid; and means mounting the operating device in the cover to prevent flame egress.

References Cited by the Examiner

UNITED STATES PATENTS

| 1,889,175 | 11/1932 | Evans | 200—16 |
| 2,506,212 | 5/1950 | Grohsgal | 174—53 |
| 2,506,505 | 5/1950 | Jeffrey | 200—168 |
| 2,886,675 | 5/1959 | Berry | 200—168 |

FOREIGN PATENTS 467,740   6/1937   Great Britain.

KATHLEEN H. CLAFFY, *Primary Examiner.*

ROBERT K. SCHAEFER, *Examiner.*